UNITED STATES PATENT OFFICE.

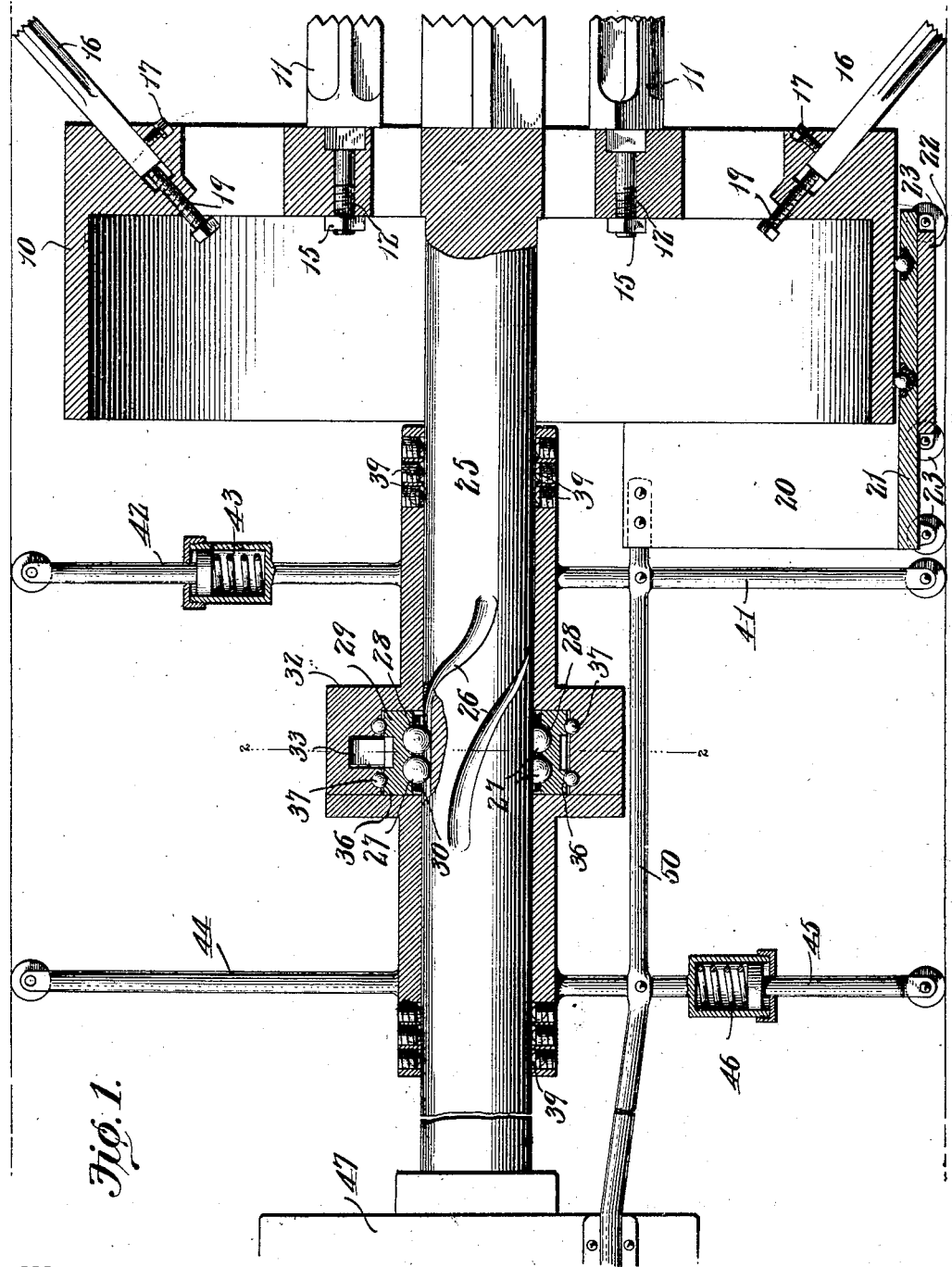

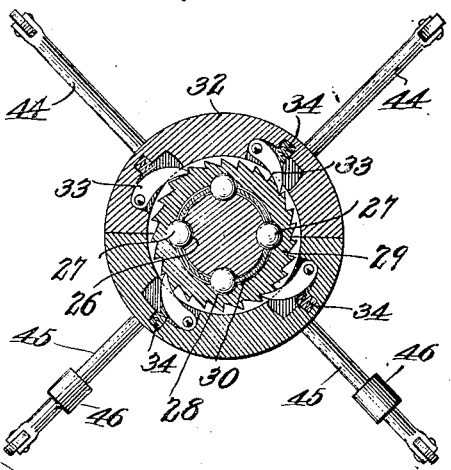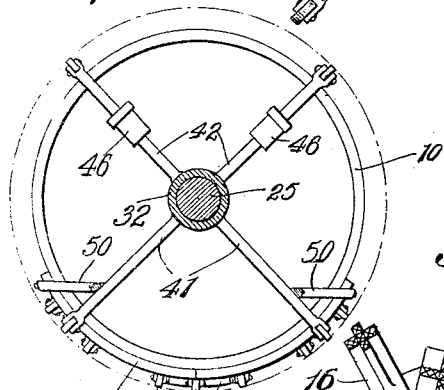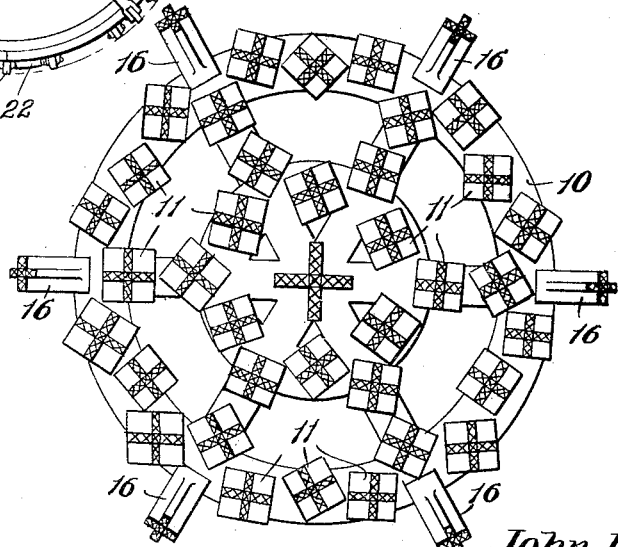

JOHN P. KARNS, OF BOULDER, COLORADO, ASSIGNOR TO THE J. P. KARNS TUNNELING MACHINE CO., OF BOULDER, COLORADO, A CORPORATION.

TUNNELING-MACHINE.

No. 875,664.     Specification of Letters Patent.     Patented Dec. 31, 1907.

Application filed April 30, 1906. Serial No. 314,541.

*To all whom it may concern:*

Be it known that I, JOHN P. KARNS, a citizen of the United States, residing at Boulder, in the county of Boulder and State of Colorado, have invented a new and useful Tunneling-Machine, of which the following is a specification.

This invention relates to tunneling machines, and has for one of its objects to provide improved means for turning the drill carrying head, and especially to reduce the friction between the rifled shaft and the nut in machines of large size.

A further object of the invention is to provide a turning device arranged on a rifled portion of the shaft at a point adjacent to the drill head, and independent of the engine by which reciprocatory movement is imparted to the shaft.

A still further object of the invention is to provide a tunneling machine in which the carrying shaft is helically grooved and the nut is provided with straight or slightly helical grooves for the reception of anti-friction balls in order to eliminate the sliding friction common to drills of the ordinary type where the rifled shaft and nut are provided with closely fitting rib and groove connections.

A still further object of the invention is to provide an improved support located at a point adjacent to the drill head and carrying the turning mechianism, so that strain and frictional wear on the shaft will be materially lessened.

A still further object of the invention is to provide a tunneling machine in which the drill head is supported on suitable shoes, and the shaft is provided with supports, and shoes and the supports being connected to the operating engine or its frame, so that as the latter is advanced into the tunnel, the drill head and all of its assembled parts will be correspondingly moved.

A still further object of the invention is to provide a drill shaft support that is more or less yieldable in order to permit slight variations in the angular position of the shaft and engine with respect to the cutting.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a tunneling machine constructed in accordance with the invention. Fig. 2 is a transverse sectional view of the same on the line 2—2 of Fig. 1, the view being on a smaller scale. Fig. 2$^a$ is a corresponding view on the line 2$^a$—2$^a$ of Fig. 1. Fig. 3 is a face view of the drill head also on a smaller scale. Fig. 4 is a detail sectional view of the ratchet ring detached.

Similar numerals of reference are employed to indicate corresponding parts throughout the several figures of the drawings.

The drill head 10 is made of any desired diameter, and is provided with numerous openings for the reception of the shanks of drills 11 that are provided with pointed cutting faces. The shanks are provided with rectangular portions that extend into rectangular openings in the drill head, and each shank is further provided with a threaded stem 12 that extends entirely through the drill head and receives a suitable clamping nut 15. In addition to the drills 11 a number of drills 16 are employed, these being arranged on diagonal lines, and projecting some distance beyond the periphery of the head proper for the purpose of cutting an opening or drift of greater diameter than the head. The diagonal drills 16 are locked in place by setscrews 17 and their rear ends rest against screws 19 which permit of adjustment of the drills.

The drill head is principally supported on two curved shoes 20, each of which is formed of an upper plate 21, and a lower plate 22, the upper plate being provided with openings for the reception of bearing balls on which the drill head rests, and the lower plates serving as supports for said balls. The shoes are mounted on small rollers or wheels 23 which are arranged to permit forward movement of the shoes as the drilling operation progresses, while the balls will permit free rotative and to and fro movement of the drill head during the cutting operation.

Extending rearward from the center of the drill head is a shaft 25 provided with helical grooves 26, preferably of semi-circular form in cross section and designed for the rection of balls 27. The outer portions of the balls fit within straight or slightly helical grooves 28 that are formed in the inner bore or wall of the ratchet ring 29, and said balls are maintained in proper relative position by a cage 30 formed of comparatively thin metal, and having openings through which the balls may extend into the grooves 26 and 28.

The ratchet ring is inclosed within a cylindrical casing 32 which carries a number of pivoted pawls 33 that are pressed inward into engagement with the teeth of the ratchet ring by small springs 34.

The ratchet ring is of considerable width, and the angular series of ratchet teeth are arranged approximately at the center of the width of the ring, and the periphery of said ring at points on each side of the ratchet teeth is provided with annular grooves 36 forming ball races for the reception of antifriction balls 37, the opposite face of the ball race being formed by grooves within the interior of the casing 32.

The construction of this portion of the mechanism is such that there is no sliding friction between the rifled shaft, the ratchet nut, and the casing. As the shaft moves on its rearward stroke, the ratchet wheel is locked by the pawls, and as the balls 27 travel in the helical grooves of the shaft, the latter will be turned to an extent proportioned to the length of the stroke, and the inclination of the grooves. On the forward movement, the shaft will travel straight ahead, and the ratchet wheel will be turned past the pawls.

The casing 32 is extended on each side of the ratchet ring and forms a support for the shaft 25, the extended portions of the casing carrying bearing balls 39 in order to permit free rotative and longitudinal movement of the shaft.

The casing is supported by a plurality of radiating bars arranged in two sets, and there are preferably four of such bars in each set. The two lower bars 41 are rigid, while the upper bars 42 are provided with yieldable sections, including springs 43 to permit the slight yielding necessary for changes in the angular position of the shaft and engine, and to accommodate any irregularities in the tunnel or drift. The second set of supporting bars include upper rigid members 44 and lower members 45 having springs 46, the arrangement of the yieldable sections below the shaft in the rear set, and above the shaft in the front set, as shown in Fig. 2, tending to maintain the shaft in a central position in the tunnel.

The engine employed for operating the drill may be operated by air, steam or other fluid under pressure, and in the present instance 47 indicates the forward end of the cylinder of the engine, said engine being supported in the usual manner to permit gradual forward feeding of the cylinder as the cutting progresses, and then after a certain length of cut, as, for instance, forty to forty-eight inches, the engine supports are readjusted, and the cutting again started. This mechanism, however, is common in the art, and detailed illustration thereof is not necessary to a full understanding of the invention.

The forward end of the cylinder, in the present instance, is connected to the inner ends of a pair of rods 50 which are rigidly secured to the lower bars of both the forward and rear sets, and are, also, connected to the shoes 20, so that each time the cylinder is moved forward, the shoes and the shaft supports are, also, traveled forward.

It is obvious that the drilling head may be made of any diameter, and that any form of engine may be employed for the purpose of effecting the reciprocatory movement of the head and shaft. It is, unnecessary, however, to employ the drill rotating devices which are commonly placed at the ends of the cylinders of ordinary compressed air rock drills, and the construction of the engine may, therefore, be materially simplified. By placing the shaft rotating mechanism adjacent to the drilling head, the latter may be more readily and more effectively supported in place and there is less likelihood of the drill head being deflected where the material is of varying density.

I claim:—

1. In a machine of the class described, a reciprocatory member having helical grooves, a ratchet ring through which said member extends, provided with approximately straight grooves, anti-friction balls extending into both grooves, pawls coacting with the ratchet ring, and means for supporting the pawls.

2. In apparatus of the class described, a reciprocatory member having helical grooves, a ratchet ring having grooves in its inner face, anti-friction balls fitting in both grooves and connecting the reciprocating member to the ring, a cage having openings for the passage of the balls, an inclosing casing for the ratchet ring, and pawls carried by the casing and engaging the teeth of the ratchet ring.

3. In apparatus of the class described, a reciprocatory member having helical grooves, a ratchet ring, the inner wall of which is provided with grooves, a plurality of anti-friction balls arranged in both grooves and connecting the reciprocatory member to the ring, a casing inclosing the ratchet ring, and pawls carried by the casing and engaging the ratchet teeth.

4. In a tunneling machine, a drill carrying head, a shaft carrying said head and provided with helical grooves at a point adjacent the head, a shaft support including a casing inclosing a portion of the shaft near the head, a ratchet ring arranged within the casing and provided with grooves in its inner face, anti-friction balls fitting within the grooves and connecting the shaft to the ring, and pawls carried by the casing and engaging the ratchet teeth.

5. In a tunneling machine, a drill head, a shaft carrying the same and provided with helical grooves, a casing encircling the shaft at a point adjacent to the drill carrying head, means for supporting said casing, a ratchet ring arranged within the casing and provided with grooves, anti-friction balls fitted within the grooves and connecting the shaft to the ratchet ring, and pawls carried by the casing and engaging the ratchet teeth.

6. In a tunneling machine, a drill head, a shaft carrying the same and provided with helical grooves, a casing encircling the shaft at a point adjacent to the drill carrying head, means for supporting the casing, a ratchet ring arranged within the casing and provided with internal grooves, anti-friction balls fitting within the grooves and connecting the shaft to the ratchet ring, pawls carried by the casing and engaging the ratchet teeth, said ratchet ring having peripheral grooves on opposite sides of the ratchet teeth to form ball races, and anti-friction balls arranged therein and fitting within ball races formed in the casing.

7. In apparatus of the class described, a ratchet shaft having helical grooves, a ratchet ring having straight grooves of a number corresponding to the helical grooves, anti-friction balls fitting within the grooves, means for preventing rotative movement of the ratchet ring in one direction, the teeth of said ratchet ring being approximately midway of its width, there being grooves on opposite sides of the ratchet teeth, a casing having grooves opposing those of the ratchet ring, and anti-friction balls arranged within said grooves.

8. In a tunneling machine, a drill head, a shaft carrying the same, a sleeve or casing for supporting the shaft, and a pair of sets of sleeve supports, the lower members of the forward support being rigid, and the upper members yieldable, and the lower members of the rear support being yieldable and the upper members rigid.

9. In a percussive tunneling machine, the combination with a drill head, of a shaft carrying the same, a sleeve in which the shaft is mounted, a pair of spaced supports for the sleeve, said supports being arranged to engage with the wall of the tunnel, an engine for operating the shaft, a supporting shoe for the drill head, there being revoluble supports on the shoe to permit the latter to move in the direction of the length of the tunnel independently of the drill head, and bars forming a rigid connection between a relatively stationary portion of the frame, the sleeve supports and the shoe.

In testimony that I claim the foregoing as my own, I have hereto affixed my signature in the presence of two witnesses.

JOHN P. KARNS.

Witnesses:
   Jno. E. Parker,
   Frank S. Appleman.